(12) United States Patent
Peng et al.

(10) Patent No.: US 10,384,148 B2
(45) Date of Patent: Aug. 20, 2019

(54) CRYSTALLIZATION COLUMN AND CRYSTALLIZATION METHOD

(71) Applicants: CHINA PETROLEUM & CHEMICAL CORPORATION, Beijing (CN); Fushun Research Institute of Petroleum and Petrochemicals, SINOPEC CORP., Fushun, Liaoning (CN)

(72) Inventors: Deqiang Peng, Liaoning (CN); Huimin Qi, Liaoning (CN); Luyao Wang, Liaoning (CN); Xin Chen, Liaoning (CN); Fanfei Meng, Liaoning (CN); Yan Wang, Liaoning (CN); Jie Liu, Liaoning (CN)

(73) Assignees: CHINA PETROLEUM & CHEMICAL CORPORATION, Beijing (CN); Fushun Research Institute of Petroleum and Petrochemicals, SINOPEC CORP., Fushun, Liaoning (CN)

( * ) Notice: Subject to any disclaimer, the term of this patent is extended or adjusted under 35 U.S.C. 154(b) by 0 days.

(21) Appl. No.: 15/745,050

(22) PCT Filed: Nov. 9, 2015

(86) PCT No.: PCT/CN2015/094102
§ 371 (c)(1),
(2) Date: Jan. 15, 2018

(87) PCT Pub. No.: WO2017/008416
PCT Pub. Date: Jan. 19, 2017

(65) Prior Publication Data
US 2018/0264377 A1    Sep. 20, 2018

(30) Foreign Application Priority Data
Jul. 15, 2015  (CN) .......................... 2015 1 0414141

(51) Int. Cl.
*B01D 7/02*    (2006.01)
*C01C 1/20*    (2006.01)
(Continued)

(52) U.S. Cl.
CPC ............. *B01D 7/02* (2013.01); *B01D 9/0013* (2013.01); *B01D 9/0045* (2013.01);
(Continued)

(58) Field of Classification Search
CPC .......... C01C 1/20; B01D 7/02; B01D 53/002; B01D 53/52; B01D 9/0013; B01D 9/0045;
(Continued)

(56) References Cited

U.S. PATENT DOCUMENTS 4,590,038 A * 5/1986 Schreiber ................. B01D 9/00
                                                        422/142
4,891,190 A    1/1990 Carter et al.
(Continued)

FOREIGN PATENT DOCUMENTS

CN         1205983 A     1/1999
CN       202942677 U     5/2013
(Continued)

*Primary Examiner* — Timothy C Vanoy
(74) *Attorney, Agent, or Firm* — Novick, Kim & Lee PLLC; Allen Xue (57) ABSTRACT

A crystallization column and a crystallization method. The crystallization column comprises an upper head (1), a tower body (2) and a lower head (3), wherein a crystallization section (11) is provided with a tray (14); and the tray (14) comprises a tray plate (15) and a plurality of lower crystallization members (17). The top end of the lower crystallization member (17) can form a movable connection with the tray plate (15), so that the two adjacent lower crystallizing members (17) are capable of oscillating collisions. The tray (14) may also comprise a plurality of upper crystallization members (21) extending upwardly from the upper surface of the tray plate (15).

28 Claims, 3 Drawing Sheets

(51) Int. Cl.
*B01D 9/00* (2006.01)
*B01D 53/52* (2006.01)
*B01D 53/00* (2006.01)

(52) U.S. Cl.
CPC .......... *B01D 53/002* (2013.01); *B01D 53/52* (2013.01); *C01C 1/20* (2013.01); *B01D 9/005* (2013.01); *B01D 2009/0086* (2013.01); *B01D 2251/2062* (2013.01)

(58) Field of Classification Search
CPC .......... B01D 2251/2062; B01D 9/0081; B01D 2009/0086; B01D 2257/304; B01D 9/00
See application file for complete search history.

(56) References Cited

U.S. PATENT DOCUMENTS

| | | | |
|---|---|---|---|
| 4,891,191 A | 1/1990 | Carter et al. | |
| 6,658,851 B2 * | 12/2003 | Jellema | B01D 5/0012 |
| | | | 60/687 |
| 2012/0118835 A1 * | 5/2012 | Huisjes | B01D 9/0013 |
| | | | 210/807 |

FOREIGN PATENT DOCUMENTS

| | | | | |
|---|---|---|---|---|
| CN | 103752032 A | 4/2014 | | |
| EP | 3093062 A4 * | 3/2017 | ............ | B01D 53/48 |
| IT | 940566 B * | 2/1973 | ........... | B01D 9/0013 |

* cited by examiner

CRYSTALLIZATION COLUMN AND CRYSTALLIZATION METHOD

FIELD OF THE INVENTION

The invention belongs to the field of chemical engineering, and relates to crystallization equipment for a gas-phase reaction, in particular to a crystallization column for treating two gas reactions to produce a solid phase and a crystallization method thereof.

BACKGROUND OF THE INVENTION

Crystallization is the process in which solid matters are precipitated from steam, solution or melts in the crystal state. The traditional industrial crystallization research field, generally, can be divided into four categories, i.e., solution crystallization, melt crystallization, precipitate crystallization and sublimation crystallization.

Crystallization equipment is important unit chemical equipment. At present, cooling crystallization equipment mainly applies dividing wall cooling crystallization equipment and vacuum cooling crystallization equipment, wherein most of the dividing wall cooling crystallization equipment is provided with jacket cooling crystallization tanks, which are high in water consumption, easy in scaling on the heat exchange surface and low in cooling production efficiency; and the vacuum cooling crystallization equipment is only used in minority of enterprises, and generally, owing to sprayed vacuumizing under steam, the energy consumption of steam is higher. In order to overcome the defects and deficiencies of the dividing wall cooling crystallization equipment and the vacuum crystallization equipment, the air-cooled crystallization column has been applied in the cooling crystallization of chemical industry production, however, the problems of high volume and energy consumption of the crystallization column still exit.

In addition, the existing crystallization column has the problems of difficult dropping of crystal substances, high energy consumption and low concentration of acidic water formed, resulting in resource wastes. For example, the conventional crystallization column structure formed by multiple layers of perforated plates is complex and high in costs, crystal substances are easy to enrich and can be firmly bound to the crystallization plate without dropping, and are required to be dropped by means of the periodic vibration of additional vibration equipment on the crystallization column, resulting in high energy consumption. In addition, the blockage of crystal substances on perforated holes is also required to be prevented, and even shutdown is also required at variable intervals to maintain or assist the dropping of crystal substances, achieving low efficiency of crystallization column. In addition, when the crystal substances are difficult to drop, for high water volume for washing crystal substances and low concentration of acidic water formed, it is the problem to be solved during the design of the crystallization column.

SUMMARY OF THE INVENTION

Aiming at the above-mentioned defects or deficiencies in the prior art, the invention provides a crystallization column and a crystallization method thereof. The crystallization column is simple in structure, low in cost, high in crystallization efficiency and easy in dropping of crystal substances. In order to fulfill the above-mentioned aim, a crystallization column is provided in accordance with one aspect of the invention, which comprises an upper head with a gas outlet, a tower body and a lower head with a gas inlet and a material outlet, wherein the tower body comprises a crystallization section; a tray is arranged in the crystallization section and comprises a tray plate extending from the inner wall of the tower body and a plurality of lower crystallization members which are arranged on the lower surface of the tray plate at intervals with each other.

The top end of the lower crystallization member can form movable connection with the tray plate, so that the two adjacent lower crystallizing members are capable of oscillating collisions. Preferably, a plurality of lifting lugs are arranged on the lower surface of the tray plate at intervals; and lifting rings can be arranged on the top ends of the lower crystallization members and are in buckled connection with the lifting lugs, so that the lower crystallization members can oscillate. a plurality of lifting lugs are uniformly arranged on the lower surface of the tray plate, and a plurality of lower crystallization members are in one-to-one correspondence connection to a plurality of lifting lugs. The lower crystallization members can comprise lifting rings and lower cylinders, and radial distance between any two adjacent lower cylinders which are in the overhanging shape is smaller than the axial height of the lower cylinders.

A bulge can be arranged on the surface of the lower cylinder. The bulge is a spiked object preferably, and a plurality of spiked objects extends radically upwards from the surface of the lower cylinder respectively, so that the lower cylinder forms a mace-shaped structure. The maximum radial extension length of the spiked object may be $1/20$ to $1/8$ of the axial height of the lower cylinder, with $1/15$ to $1/10$ preferably. In the mace-shaped lower cylinder, height gap between the upper and lower adjacent spiked objects are $1/20$ to $1/8$ of the axial height of the lower cylinder, with $1/15$ to $1/10$ preferably.

In order to form the movable connection, the top end of the lower crystallization member may also be connected to the lower surface of the tray plate via a flexible rope. Or, the lower crystallization member is an elastic member or a flexible member which is fixedly connected to the lower surface of the tray plate, wherein the elastic member or the flexible member can be bent, so that the two adjacent lower crystallization members are capable of oscillating collisions. Of course, the lower crystallization member may also comprise the lower cylinder and a flexible thread, wherein the flexible thread is arranged on the lower cylinder to form a torsion wire brushed type structure.

Wherein one end of the tray plate is connected with the inner wall of the tower body, while the other end transversely extends, and a gas circulation gap is formed between the extension end and the inner wall on the opposite side of the tower body.

Preferably, multiple layers of trays which are sequentially separated up and down are arranged in the crystallization section and are arranged on two sides of the central axis of the tower body and are arranged right and left in a staggered way, so that the gas phase can pass through the gas circulating gap of each tray plate upwardly to form bend fluid.

More preferably, the tray plate also comprises a plurality of upper crystallization members, which extend upwardly from the upper surface of the tray plate. In the upper and lower adjacent trays, a height gap is formed between the top end of the upper crystallization member of the lower tray and the bottom end of the lower crystallization member of the upper tray, which ranges from 20 mm to 150 mm preferably, and more preferably 50 mm to 100 mm.

The upper crystallization member may comprise the upper cylinder and the flexible thread, wherein the flexible thread is arranged on the upper cylinder to form a torsion wire brushed type structure. The upper cylinder may be made of stainless steel, tetrafluoride or carbon steel outer lining tetrafluoride, the flexible thread is a material which does not react with ammonium hydrosulfide and is water insoluble, such as one of carbon fiber, nylon, fluoroplastic-sand stainless steel wire. The diameter of the flexible thread ranges from 1 mm to 12 mm. When the flexible thread is made of metals, the diameter of the flexible thread will range from 1 mm to 3 mm preferably; and when the flexible thread is made of non-metals, the diameter of the flexible thread will range from 2 mm to 5 mm preferably.

The tower body may also comprise a cooling section, wherein a heat taking component is arranged in the cooling section, which is preferably one of a multitubular evaporative cooler, a plate heat exchanger, an electrical refrigerating unit, a fuel gas type lithium bromide unit. The tower body may also comprise a feed mixing section positioned below the cooling section, wherein a gas-phase distributor is arranged in the feed mixing section, which is preferably one of an aerator, a plate-type gas-phase distributor or a tank tray type gas-phase distributor. The upper head is also provided with a water inlet, which can be connected with a water inlet distribution pipe, and a plurality of spray nozzles are arranged on the water inlet distribution pipe. The water inlet and the gas outlet may be the same opening, or the water inlet and the gas outlet are separately arranged.

According to the other aspect of the invention, the invention also provides a crystallization method. According to the crystallization method, gas to be crystallized is introduced into the tower body from the gas inlet by using the crystallization column, the gas to be crystallized reacts for crystallization on the tray on the crystallization section, and the crystallized gas is discharged out of the gas outlet. The crystallization method also comprises the following step of: introducing water from the top of the tower body to wash crystal substances on the tray, and making the mixed solution of the washed water and crystal substances flow out of a material outlet.

Wherein the gas to be crystallized is preferably mixed gas of hydrogen sulfide containing gas and ammonia gas. The molar ratio of hydrogen sulfide containing gas to ammonia gas is 1:1 to 1:2, with 5:6 to 2:3 preferably. The reaction crystallization temperature of hydrogen sulfide containing gas and ammonia gas is 0° C. to 40° C., with 0° C. to 20° C. preferably.

Compared with the prior art, the crystallization column of the invention at least has the following advantages:

1) In the crystallization column of the invention, the tray and a plurality of lower crystallization members which are hung are arranged in the crystallization section; when flowing through the lower crystallization member, reactant gas is easily in crystallized attachment to the surface of the lower crystallization member. The gas phase flows through the lower crystallization member, there is a difference in flowing around the lower crystallization member; crystallized attachment is in the non-uniform state, and the oscillation of the lower crystallization member is easy to cause under the swaying of gas-phase flowing and the offset of center of gravity, hence, once producing collision with the adjacent lower crystallization members, the crystal substances will be crushed and stripped to drop the next layer of tray or the bottom of the tower body, thereby achieving easiness in the crystallization and stripping of the crystallization column of the invention;

2) In the crystallization column of the invention, the attachment areas of the crystal substances are greatly increased by arranged the torsion wire brushed type upper crystallization member; when the crystal substances on the previous layer of tray drop, the wire space of the upper crystallization member still exits, making the dropped crystal substances in the fluffy state, reactant gas still can pass through the space, and crystallized attachment can be sequentially formed in the such process; and the surfaces of the dropped crystal substances can also be used as the crystallized attachment surfaces, thereby greatly increasing the areas of the crystallized attachment surfaces. When the crystal substances are filled in the gap of the torsion wire brushed type upper crystallization member, operation is switched, and water is injected into the top of the crystallization column filled with the crystal substances, and as the crystal substances are in the fluffy state between the gaps of the torsion wire brushed type crystallization column, which is extremely easy drop to the tray plate under the impulsion of a water injection distributor;

3) The crystallization column of the invention is large in surface areas of the attached crystal substances, easy in dropping and accumulation of crystal substances on the tray, small in water injection amount and high in concentration of acidic water, can effectively reduce the energy consumption of the steam stripping of acidic water, is suitable for the ammonium hydrosulfide crystallization process in the acidic water treatment process of the refinery plant, and is particularly suitable for the separation process of hydrogen sulfide in acid gas containing carbon dioxide.

Other features and advantages of the present invention will be further detailed in the embodiments hereunder.

BRIEF DESCRIPTION OF DRAWINGS

The accompanying drawings are provided here to facilitate further understanding of the present invention, and constitute a part of this document. They are used in conjunction with the following embodiments to explain the present invention, but shall not be comprehended as constituting any limitation to the present invention. In the figures.

| Brief Description of the Symbols | | | |
|---|---|---|---|
| 1 | Upper head | 2 | Tower body |
| 3 | Lower head | 4 | Gas outlet |
| 5 | Water inlet | 6 | Water inlet distribution pipe |
| 7 | Material outlet | 8 | Gas inlet |
| 9 | Feed mixing section | 10 | Cooling section |
| 11 | Crystallization section | 12 | Gas-phase distributor |
| 13 | Heat taking component | 14 | Tray |
| 15 | Tray plate | 16 | Lifting lug |
| 17 | Lower crystallization member | 18 | Lifting ring |
| 19 | Lower cylinder | 20 | Spiked object |
| 21 | Upper crystallization member | 22 | Flexible thread |
| 23 | Upper cylinder | | |

DETAILED DESCRIPTION OF THE EMBODIMENTS

Hereunder some embodiments of the present invention will be detailed with reference to the accompanying drawings. It should be understood that the embodiments described here are only provided to describe and explain the present invention, but shall not be deemed as constituting any limitation to the present invention.

In the present invention, unless otherwise specified, the terms of locality, such as "upper", "lower", "top", "bottom", etc., are words that describe the positional relation among components and are usually defined in relation to the directions 5 indicated in the accompanying drawings or in relation to vertical or gravity direction; "vertical direction" refers to the up-down direction of the sheet surface indicated in the figure, and "transverse" is usually defined in relation to the left-right direction of the approximately horizontal sheet surface indicated in the figure; and "inside and outside" refer to the inside and outside of the cavity relative to the cavity.

Figure 1:
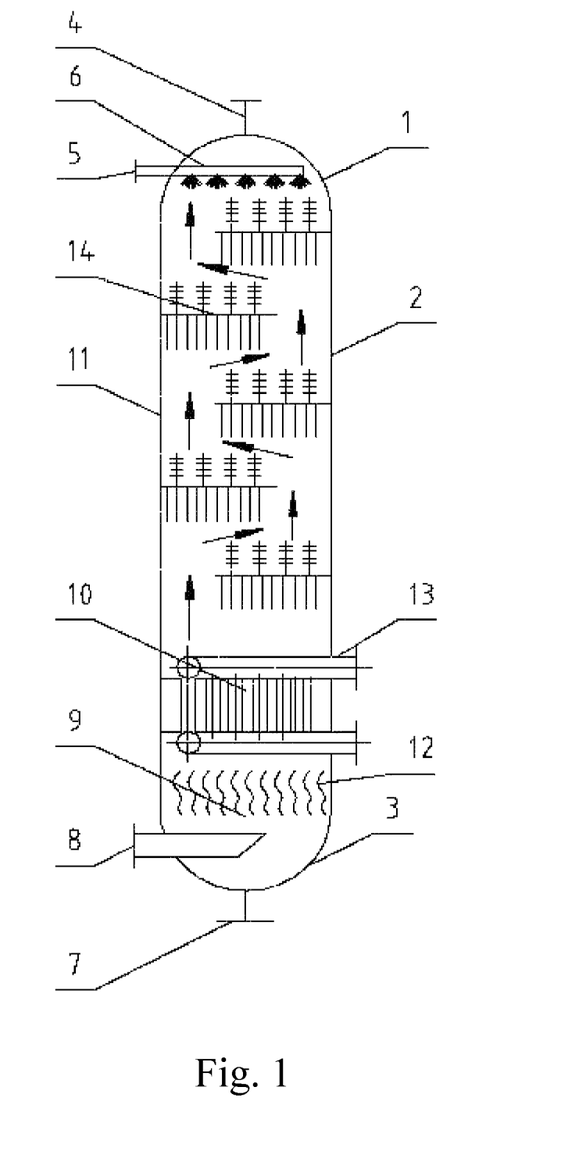
FIG. 1 is a structural schematic diagram of the crystallization column according to the preferred embodiment of the invention, and the arrows in the figure represent the flowing direction of the gas phase, i.e., forming upward bend fluid.

As shown in the FIG. 1, the invention provides a crystallization column, which comprises an upper head 1 with a gas outlet 4, a tower body 2 and a lower head 3 with a gas inlet 8 and a material outlet 7, wherein the tower body 2 comprises a crystallization section 11; a tray 14 is arranged in the crystallization section 11 and comprises a tray plate 15 approximately and transversely extending from the inner wall of the tower body 2 and a plurality of lower crystallization members 17 which are arranged on the lower surface of the tray plate 15 at intervals with each other.

The crystallization column of the invention is preferably applied to the gas-gas crystallization reaction, but is not limited to this. The crystallization column can also be used for other gas-liquid reactions. Gas to be crystallized enters the tower body 2 from the gas inlet 8 to produce crystals in the tray 14 in the crystallization section 11, which are attached and crystallized to the lower crystallization member 7 of the tray plate 15; the stripped crystal substances drop or are washed to the material outlet 7 at the bottom of the tower body 2 to be discharged for the next process flow, and gas after reacting is discharged from the gas outlet 4.

Figure 4:
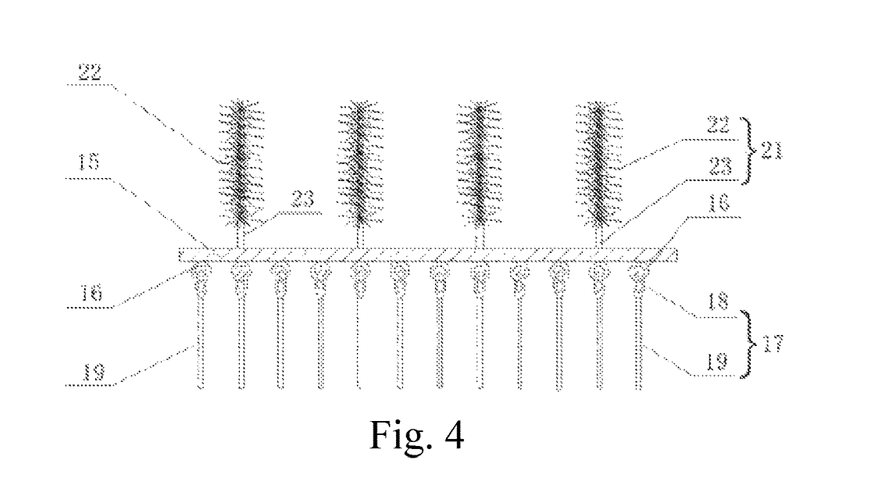
Figure 5:
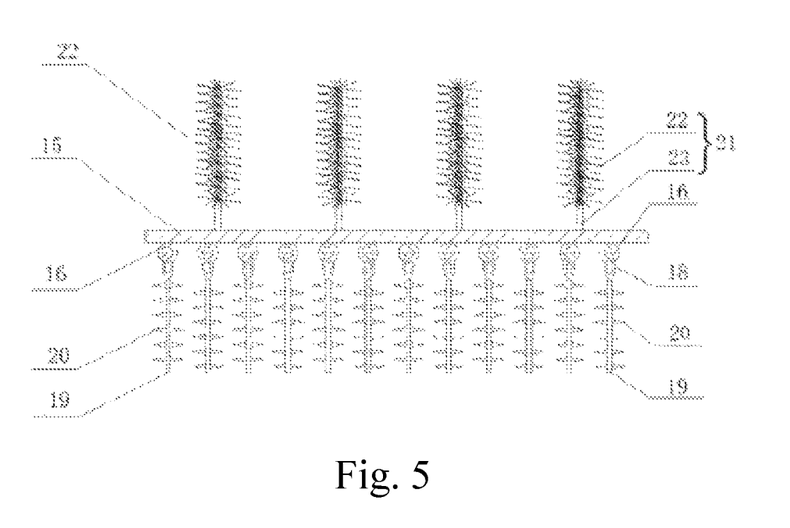
Figure 6:
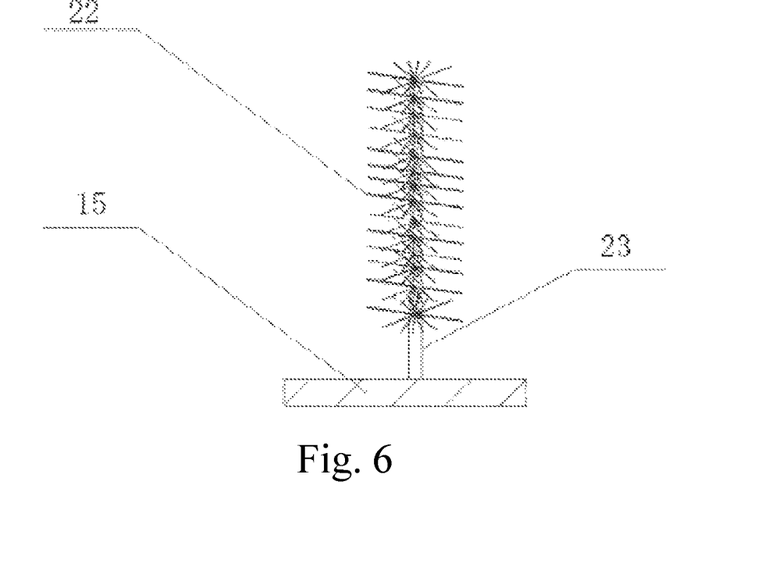
FIG. 6 is a structural diagram of the upper crystallization members according to the preferred embodiment of the invention.

Different from the complex and expensive crystallization apparatus in the prior art, the crystallization apparatus of the invention is simple in structure, i.e., a plurality of lower crystallization members 17 which are hung extend from the tray 14 with large crystallization area; and crystal substances on the lower crystallization member 17 are easily stripped from the lower crystallization member 17 under the disturbance of flowing gas while increasing the crystallization area.

Wherein the lower crystallization member 17 can form the torsion wire brushed type structure shown as the FIG. 6, and its surface area is large, which is convenient in attached crystallization. The lower crystallization member 7 with the torsion wire brushed type structure can be fixedly or movably connected to the lower surface of the tray plate 15. Or, the lower crystallization member 17 can be an elastic member or a flexible member which is fixedly connected to the lower surface of the tray plate 15, wherein the elastic member or the flexible member can be bent, so that the two adjacent lower crystallization members 17 are capable of oscillating collisions. Or as shown in FIGS. 1 to 5, the top end of the lower crystallization member 17 can form movable connection with the tray plate 15, so that the two adjacent lower crystallizing members 17 are capable of oscillating collisions. When flowing through the lower crystallization member 17, reactant gas is easy in crystallized attachment on its surface, and when the gas phase flows through the lower crystallization member 17, it is necessary to have a certain difference in the flow field or flow velocity, so that the crystal substances attached to the lower crystallization member 17 are non-uniform in distribution. Owing to movable connection between the lower crystallization member 17 and the tray plate 15 and the non-uniform distribution of the crystal substances, it is inevitably to produce the offset of center of gravity for the lower crystallization member 17 under the gravity of the lower crystallization member 17 and the crystal substances as well as the swaying of the gas-phase flowing, resulting in oscillation easily; and once producing collision with the adjacent lower crystallization members 17, the crystal substances will be crushed and stripped to drop the next layer of tray 14 or the bottom of the tower body 2.

In order to form movable connection, as shown in FIGS. 2 to 5, a retaining ring sliding connection way of lifting rings and lifting lugs is illustrated. Wherein a plurality of lifting lugs 16 are arranged on the lower surface of the tray plate 15 at intervals, the lifting ring 18 is arranged at the top end of the lower crystallization member 17 and is in buckled connection with the lifting lugs 16, so that the lower crystallization member 17 can oscillate. Preferably, a plurality of lifting lugs 16 are uniformly arranged on the lower surface of the tray plate 15, and a plurality of lower crystallization members 17 are in one-to-one correspondence connection to a plurality of lifting lugs 16. Those skilled in the art could know that there are many forms and connecting structures to form the movable connection, which are not limited the buckled ring sliding connection way. For example, the top end of the lower crystallization member 17 can also be connected to the lower surface of the tray plate via the flexible rope, and the two adjacent lower crystallization members 17 can oscillate and collide with each other under air flow blowing or gravity deflection.

Figure 2:
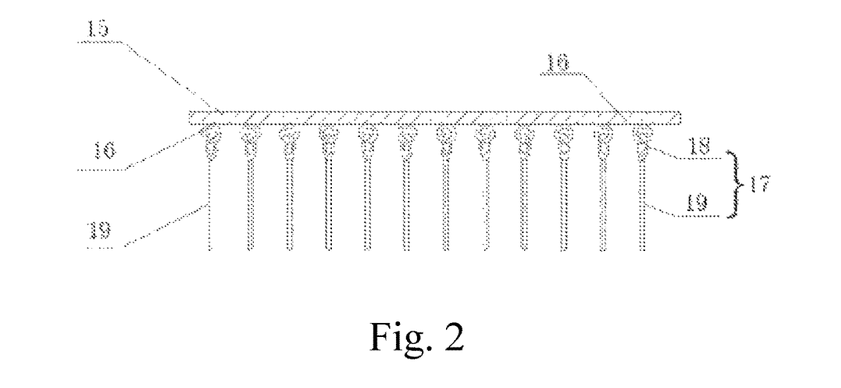
FIGS. 2 to 5 are structural diagrams of the tray according to multiple embodiments of the invention.
Figure 3:
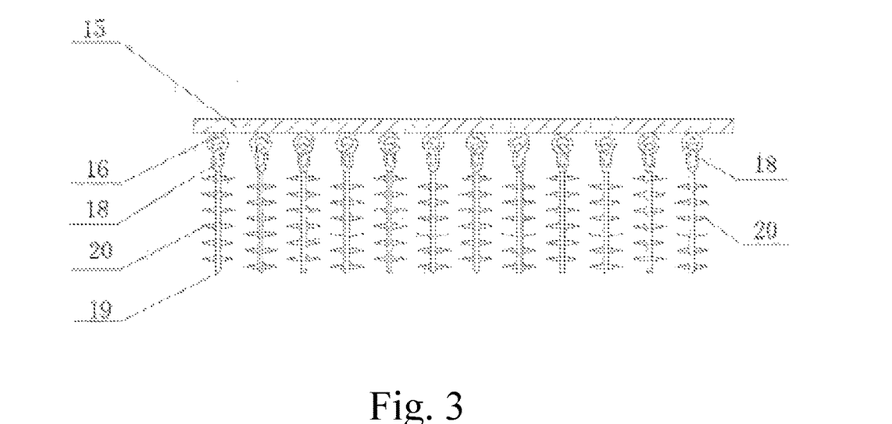

As shown in the FIG. 2, in one preferred embodiment of the lower crystallization member 17, the lower cylinder 19 and the lifting ring 18 connected to the top end of the lower cylinder 19 are included. When the lower crystallization members are in one-to-one correspondence connection to a plurality of lifting lugs 16 which are uniformly arranged, the length of the lower crystallization member 17 and the interval density shall be favorable of oscillation and collision, for example, in many embodiments as shown in the figure, radial distance between the centers of any two adjacent lower cylinders 19 which are overhung downwards is smaller than the axial height of the lower cylinder 19.

In order to increase the surface area of the lower crystallization member 17 to promote attached crystallization, bulges are also arranged on the surface of the lower cylinder 19. The lower crystallization member 17 according to the other preferred embodiment as shown in the FIG. 3 not only comprises the lower cylinder 19 and the lifting ring 18, but also comprises a plurality of spiked object 20 formed on the surface of the lower cylinder 19, which extend outwards from the surface of the lower cylinder 19 in the radial direction, so that the lower cylinder 19 is in the mace-shaped structure. In addition, as shown in the FIG. 3, the adjacent mace-shaped lower crystallization members 17 are preferably staggered with each other in height, so that during the oscillating collision of the adjacent lower crystallization members 17, the spiked object 20 can align with the crystal substance between the two spiked objects 20 on the other side, making it stripped easily. Similarly, in order to maximize the surface area and facilitate the crystallization and stripping of crystal substances, in many embodiments as shown in the figure, the maximum extension length of the spiked object 20 in the radial direction is $\frac{1}{20}$ to $\frac{1}{8}$ of the axial height of the lower cylinder 19, with $\frac{1}{15}$ to $\frac{1}{10}$ preferably. In the mace-shaped lower cylinder, height gap between the upper and lower adjacent spiked objects is 1/20 to 1/8 of the axial height of the lower cylinder, with 1/15 to 1/10 preferably.

In addition, during the installation of the tray plate 15, one end of the tray plate is connected with the inner wall of the tower body 2, while the other end transversely extends, and a gas circulation gap is formed between the extension end and the inner wall on the opposite side of the tower body 2, the gas phase can pass through the gas circulating gap, and perforated holes are not required to be formed in the tray plate 15. The gas circulating gap is favorable for forming an air flue under guidance to sway the lower crystallization member 17. For example, multiple layers of trays 14 which are sequentially separated up and down are arranged in the crystallization section 11 as shown in the FIG. 1 and are arranged on two sides of the central axis of the tower body 2 (for clarity, it is not shown in the figure) and are arranged right and left in a staggered way, so that the gas phase can pass through the gas circulating gap of each tray plate upwardly to form bend fluid. When flowing along the direction shown as the arrow in the figure to form bend fluid, the gas phase can sway the lower crystallization member 17 on each tray plate 15, which facilitates oscillating collision and crystallization and the stripping of crystal substances. Of course, for the tray plate 15 transversely extends or transversely and obliquely extends from the inner wall of the tray plate 2, it is not limited to the arrangement ways of up-down interval and left-right staggering and is also not limited to multiple tray plates. Single tray plate 15 can also be arranged in the tower body 2 only, and perforated holes can also be formed in the single tray plate 15 to make air flow pass through.

In the crystallization column as shown in the FIG. 1, in order to increase the crystallization area, the tray 14 also preferably comprises a plurality of upper crystallization members 21, wherein the upper crystallization member 21 extends upwardly from the upper surface of the tray plate 15. As shown in the FIG. 1, gas-phase bend fluid not only can sway the lower crystallization members 17, making them achieve attached crystallization, but can also sway the upper crystallization members 21, thereby greatly increasing the crystallization area. In the upper and lower adjacent trays 14, a height gap is formed between the top end of the upper crystallization member 21 of the lower tray 14 and the bottom end of the lower crystallization member 17 of the upper tray 14, through which the gas phase can easily pass. The height gap ranges from 520 mm to 150 mm preferably, and more preferably ranges from 50 mm to 100 mm.

As shown in the FIG. 6, the upper crystallization member 21 with the preferred structural form comprises the upper cylinder 23 and the flexible thread 22, wherein the flexible thread 22 is arranged on the upper cylinder 23 to form a torsion wire brushed type structure. Such similar hair brush shape can increase the crystallization area to a great extent, crystal substances are easy to drop, and the surfaces of the dropped crystal substances can also be used as the crystallization attachment surfaces. The upper crystallization member 21 is applied to the embodiment as shown in FIGS. 4 and 5, but the difference between the FIGS. 4 and 5 is that in the FIG. 5, the lower crystallization member 17 with the spiked object 20 is used. In accordance with the reactant gas and the reaction characteristics, the upper cylinder 23 is preferably made of corrosion resistant stainless steel, tetrafluoride or carbon steel outer lining tetrafluoride, the flexible thread 22 is a material which does not react with ammonium hydrosulfide and is water insoluble, which is preferably one of carbon fiber, nylon, fluoroplastics and stainless steel wire. The diameter of the flexible thread 22 approximately ranges from 1 mm to 12 mm. When the flexible thread 22 is made of metals, the diameter of the flexible thread 22 will range from 1 mm to 3 mm preferably; and when the flexible thread 22 is made of non-metals, the diameter of the flexible thread 22 will range from 2 mm to 5 mm preferably.

In addition, see the FIG. 1, the tower body 2 also comprises a cooling section 10, wherein a heat taking component 13 is arranged in the cooling section 10, which is preferably one of a multitubular evaporative cooler, a plate heat exchanger, an electrical refrigerating unit, a fuel gas type lithium bromide unit. Gas entering the crystallization column from the gas inlet 8 can be cooled via the heat taking component 13 to be close to crystallization reaction temperature, thereby facilitating producing the crystallization reaction at the crystallization section 11 above immediately. For the cooling of the gas to be crystallized, its cooling equipment can also, according to needs, arranged outside the tower body 2. In addition, the tower body 2 also comprises a feed mixing section 9 positioned below the cooling section 10, wherein a gas-phase distributor 12 is arranged in the feed mixing section 9, which is preferably one of an aerator, a plate-type gas-phase distributor or a tank tray type gas-phase distributor. The gas-phase distributor 12 may achieve uniform gas distribution, stable flow field and uniform crystallization. In addition, the upper head 1 is also provided with a water inlet 5, the water inlet 5 is connected with a water inlet distribution pipe 6, and a plurality of spray nozzles is arranged on the water inlet distribution pipe 6. The crystal substances can be washed and dissolved by water sprayed from the spray nozzles to form acidic water, which flows out of a material outlet 7 at the bottom of the tower body 2. The crystal substances are in the fluffy state between the gaps of the torsion wire brushed type upper crystallization members 21, which is extremely easy drop to the tray plate 15 under the impulsion of water injection; As shown in the FIG. 1, the water inlet 5 and the gas outlet 4 can be separately arranged, however, water injection and reaction tail gas discharge are switching operations at different phases, hence, the water inlet 5 and the gas outlet 4 can be preferably the same opening.

On the basis of the above-mentioned crystallization column, the present invention further provides a corresponding crystallization method, i.e., gas to be crystallized is supplied to the tower body 2 through the gas inlet 8, the gas to be crystallized reacts to crystallize on the tray 14 of the crystallization section 11, and the crystallized gas is discharged from the gas outlet 4. Water is added from the top of the tower body 2 to flush the crystal on the tray 14. Mixture of the water after flushing and the crystal outflows from the material outlet 7.

Next, it will further illustrate how the crystallization column of the present invention works in conjunction with a specific application. The work procedure of the crystallization column of the present invention is specified by taking processing hydrogen sulfide-containing gas with ammonia gas as an example. The molar ratio of hydrogen sulfide containing gas to ammonia gas is 1:1 to 1:2, with 5:6 to 2:3 preferably. The reaction crystallization temperature of hydrogen sulfide containing gas and ammonia gas is 0° C. to 40° C., with 0° C. to 20° C. preferably.

First, the acid gas (hydrogen sulfide-containing gas) mixed with ammonia gas enters the crystallization column from the gas inlet 8 of the crystallization column. The gas phase uniformed distributed by a plate-type gas-phase distributor 12 inside the feed mixing section 9 enter into the cooling section 10, passes through a shell and tube evaporative cooler, and realizes cooling with the effect of the liquid ammonia. The liquid ammonia is heated by absorbing heat and becomes ammonia gas to be discharged out from the apparatus or to enter the crystallization column as the ammonia gas reacting with the acid gas. The cooled acid gas mixed with the ammonia gas starts crystallizing on the lower crystallization member 17 of the tray 14. Ammonium hydrogen sulphide crystallizes and adheres to the surface of the lower crystallization member 17 while flowing therethrough. Since there is difference in flowing around when the gas phase flows through the lower crystallization member 17, crystallization and adhering are in a heterogeneous state. Flowing blowing and deflection of the center of gravity of the gas phase causes the lower crystallization member 17 to swing, and once it collides with the adjacent lower crystallization member 17, the crystal shatters and peels off from the lower crystallization member 17 and fall to the next layer of tray 14, greatly increasing the use efficiency of the crystallization column. When crystal in the crystallization column reaches a certain weight, the crystallization tower switches operation. Water is started to be added from the water inlet 5 of the crystallization column to flush and dissolve the ammonium hydrogen sulphide crystal to form the acidic water. The acidic water is discharged out of the apparatus through the material outlet 7 arranged on the lower head 3 of the crystallization column. The water inlet 5 and the gas inlet 8 both can be provided in plural, for example, a plurality of inlets arranged at equal intervals along the circumferential direction.

Embodiments and comparative embodiments are provided below to verify the crystallization effect of the crystallization column of the present invention.

Embodiment 1

The crystallization column as shown in FIG. 1 takes the acid gas as the raw material for processing. In the acid gas, CO2 has a volume fraction of 94%, H2S has a volume fraction of 5%, and hydrocarbon has a volume fraction of 1%. The acid gas is first cooled to 20° C. by the cooler, and then uniformly mixed with the ammonia gas. The feed molar ratio of the acid gas and the ammonia gas is 2:3. The mixed material flow enters the crystallization column to obtain the gas phase material flow and the ammonium hydrogen sulphide crystal. The ammonium hydrogen sulphide crystal is deposited within the crystallization column. The result of analysis of the materials is shown in table 1.

Comparative Embodiment 1

The reaction conditions are the same as those of the embodiment 1 with only difference in replacing the crystallization column of the present invention with a common crystallizer. The common crystallizer is a conventional empty pot, but the crystallizer is ensured to have the same crystallization space with that in the crystallization column of the present invention.

As shown in Table 1, the crystallization column of the present invention can operate persistently with an outstanding crystallization effect, the crystal is easy to obtain, the water consumption is low, the gas purification degree is high, energy consumption is reduced, and the crystallization column is especially suitable for separation process of hydrogen sulfide in the carbon dioxide-containing acid gags.

While some preferred embodiments of the present invention are described above in conjunction with the accompanying drawings, the present invention is not limited to the details in those embodiments. Various simple variations can be made to the technical scheme of the present invention, without departing from the spirit of the technical idea of the present invention. For example, for heterogeneous interval distribution of the lower crystallization members 17 and connection not in one-to-one correspondence between the hanger 18 and the lifting lug 16, a single lifting lug 18 may be movably connected with a plurality of hangers 16, and the upper cylinder 23 and the lower crystallization member 17 are not limited to the shown cylinder shape and may be various curved shapes and the like. These simple variations may be deemed as falling into the protection scope of the present invention.

In addition, the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A crystallization column, comprising:
an upper head having a gas outlet, a tower body, and a lower head having a gas inlet and a material outlet, wherein the tower body comprises a crystallization section, wherein one or more trays are arranged in the crystallization section, each tray comprises a tray plate extending from the inner wall of the tower body and a plurality of lower crystallization members arranged on the lower surface of the tray plate at intervals with each other.

2. The crystallization column according to claim 1, wherein the top end of the lower crystallization member and

TABLE 1

Comparison of reaction results of the embodiment and the comparative embodiment

| | Embodiment 1 | Comparative embodiment 1 |
|---|---|---|
| crystallization situation of ammonium hydrogen sulphide | crystals are uniform, the particle size is small and easy to wash, and the formed acidic water has high concentration | the sizes of the crystals are irregular, most are in large pieces and not easy to wash, the formed acidic water has low concentration, and the volume of the formed acidic water is about 2 times that of the embodiment 1. |
| content of H2S in the purified gas (mg/Nm$^3$) | 20 | 100 |
| operation period of apparatus | stably operating for 260 h | shutdown processing is required after operating for 100 h | the lower surface of the tray plate are movably connected so that two adjacent lower crystallization members are able to swing and collide.

3. The crystallization column according to claim 2, wherein a plurality of lifting lugs are arranged on the lower surface of the tray plate at intervals; the top end of the lower crystallization member is provided with a hanger; the hanger is buckled with the lifting lug so that the lower crystallization member is able to swing.

4. The crystallization column according to claim 3, wherein the plurality of lifting lugs are uniformly disposed on the lower surface of the tray plate, and the plurality of lower crystallization members are connected with the plurality of lifting lugs in one-to-one correspondence.

5. The crystallization column according to claim 4, wherein the lower crystallization member comprises the hanger and a lower cylinder; and the radial distance between centers of any two adjacent lower cylinders overhanging downward is less than an axial height of the lower cylinder.

6. The crystallization column according to claim 5, wherein a cylinder surface of the lower cylinder is provided with a projection.

7. The crystallization column according to claim 6, wherein the projection is a spiny object, and a plurality of spiny objects radially extend outward from the cylinder surface of the lower cylinder so that the lower cylinder forms a mace structure.

8. The crystallization column according to claim 7, wherein the maximum radial length of the spiny object is 1/20 to 1/8 of the axial height of the lower cylinder.

9. The crystallization column according to claim 7, wherein, in the lower cylinder of the mace structure, the height clearance between the upper and lower adjacent spiny objects is 1/20 to 1/8 of the axial height of the lower cylinder.

10. The crystallization column according to claim 2, wherein the top end of the lower crystallization member is connected to the lower surface of the tray plate through a flexible rope.

11. The crystallization column according to claim 1, wherein the lower crystallization member is an elastic or flexible member with a top end fixedly connected to the lower surface of the tray plate, and the elastic or flexible member is bendable so that two adjacent lower crystallization members are able to swing and collide.

12. The crystallization column according to claim 1, wherein the lower crystallization member comprises a lower cylinder and a flexible thread, and the lower cylinder equipped with the flexible thread forms a torsion wire brush type structure.

13. The crystallization column according to claim 1, wherein a first end of the tray plate is connected with the inner wall of the tower body, and the second end of the tray plate extends crosswise and a gap exists between the second end and the inner wall of the opposite side of the tower body.

14. The crystallization column of the claim 13, wherein a plurality of trays are disposed on two sides of the central axis of the tower body in a vertical direction to form a left and right staggering arrangement.

15. The crystallization column according to claim 14, wherein each tray further comprises a plurality of upper crystallization members that extend upward from the upper surface of the tray plate.

16. The crystallization column according to claim 15, wherein, in an upper tray and a lower try adjacent to each other in the vertical direction, a clearance between the top end of the upper crystallization member of the lower tray and the bottom end of the lower crystallization member of the upper tray is 20 mm to 150 mm.

17. The crystallization column according to claim 15, wherein the upper crystallization member comprises an upper cylinder and a flexible thread, and the upper cylinder is equipped with the flexible thread to form a torsion wire brush type structure.

18. The crystallization column according to claim 17, wherein the upper cylinder is made of stainless steel, tetrafluorohydrazine, or carbon steel coated with tetrafluorohydrazine, wherein the flexible thread is made of carbon fiber, nylon, fluoroplastics, or stainless steel wire.

19. The crystallization column according to claim 17, wherein a diameter of the flexible thread is 1 mm to 12 mm, wherein, when the flexible thread is of metal material, the diameter of the flexible thread is 1 mm to 3 mm; and when the flexible thread is of non-metal material, the diameter of the flexible thread is 2 mm to 5 mm.

20. The crystallization column according to claim 1, wherein the tower body further comprises a cooling section having a heat removing component, and wherein; the heat removing component is one selected from the group consisting of a shell and tube type evaporative cooler, a plate type heat exchanger, an electrical refrigeration unit, and a gas type lithium bromide unit.

21. The crystallization column according to claim 20, wherein the tower body further comprises a feed mixing section located below the cooling section, wherein the feed mixing section has a gas phase distributor, and wherein the gas phase distributor is an aerator, a plate type gas phase distributor, or a trough-pan gas phase distributor.

22. The crystallization column according to claim 1, wherein the upper head further comprises a water inlet, wherein the water inlet is connected with a water distribution pipe, and wherein the water distribution pipe has a plurality of nozzles.

23. The crystallization column according to claim 22, wherein the water inlet serves is the gas outlet, or the water inlet and the gas outlet are separately disposed.

24. A crystallization method using the crystallization column of claim 1, wherein a feedstock gas enters flail the tower body through the gas inlet, reacts to crystallize on one or more of the plurality of trays in the crystallization section, and is discharged from the gas outlet.

25. The crystallization method according to claim 24, wherein the feedstock gas is a mixture of hydrogen sulfide-containing gas and ammonia gas.

26. The crystallization method according to claim 25, wherein a molar ratio of the hydrogen sulfide-containing gas and the ammonia gas is 1:1 to 1:2 in the feedstock gas.

27. The crystallization method according to claim 25, wherein a crystallization temperature of the feedstock is 0° C.-40° C.

28. The crystallization method according to claim 24, wherein the crystallization method further comprises: adding water from the top of the tower body to flush crystals on the plurality of trays, and discharge a mixture of the water after flushing and the crystals from the material outlet.

* * * * *